(12) United States Patent
Thomsen et al.

(10) Patent No.: US 6,317,516 B1
(45) Date of Patent: Nov. 13, 2001

(54) LEARNING METHOD FOR AN IMAGE ANALYSIS SYSTEM FOR USE IN THE ANALYSIS OF AN OBJECT AS WELL AS USES OF THE METHOD

(76) Inventors: Knud Thomsen, Samsøgade 83, Aarhus 8000; Peter Mikkelsen, Eghøjvej 26F, Egaa 8250; Peter Locht, Magnoliavej 13, Viby 8260, all of (DK)

( * ) Notice: Subject to any disclaimer, the term of this patent is extended or adjusted under 35 U.S.C. 154(b) by 0 days.

(21) Appl. No.: 09/171,691

(22) PCT Filed: Apr. 24, 1997

(86) PCT No.: PCT/DK97/00183

§ 371 Date: Nov. 10, 1998

§ 102(e) Date: Nov. 10, 1998

(87) PCT Pub. No.: WO97/41533

PCT Pub. Date: Nov. 6, 1997

(30) Foreign Application Priority Data

Apr. 25, 1996 (DK) .................................................. 0502/96

(51) Int. Cl.[7] ........................................................ G06K 9/62
(52) U.S. Cl. ........................... 382/224; 382/318; 382/319
(58) Field of Search ................................... 382/224, 128, 382/133, 270, 129, 134, 275, 155, 157, 159, 225, 227, 309, 318, 319

(56) References Cited

U.S. PATENT DOCUMENTS 3,705,383 * 12/1972 Frayer ................................ 340/146.3
3,824,393 * 7/1974 Brain ..................................... 250/222
5,253,302 * 10/1993 Massen ................................ 382/110
5,627,908 * 5/1997 Lee et al. ............................. 382/133

FOREIGN PATENT DOCUMENTS 574 831   12/1993   (EP) .

OTHER PUBLICATIONS

1993, Gonzales, Rafael C., "Image Segmentation", *Digital Image Processing*, pp. 458–462.

* cited by examiner

*Primary Examiner*—Andrew W. Johns
*Assistant Examiner*—Seyed Azarian
(74) *Attorney, Agent, or Firm*—Merchant & Gould P.C.

(57) ABSTRACT

In the teaching of an image analysis system, a video image of a reference object is captured. Several areas, each of which represents a class (22, 23), are marked on the video image, which is divided into pixels having their separate identification, such as color. Once all classes have been formed, each class is given a color which is assigned to all pixels in the class irrespective of identification. Pixels which may belong to more than one class, a so-called conflict class (24), and pixels which do not belong to any class, a so-called 0 class (25), are transferred to a residual class. Then the entire video image is processed in that the pixels which are not represented in the zero class (25) or the conflict class (24), are given a color value from the class having a pixel identification which is closest to the pixel concerned. The principles of the invention may be applied in general in connection with analysis techniques where objects may be characterized by means of an N-dimensional set of parameters. This provides a method which can teach an image analysis system in a quick and safe manner for use e.g. in connection with analysis of cells/tissue, analysis of cuts of meat, metallurgical analyses and other similar fields.

14 Claims, 5 Drawing Sheets

| Class | Colour in figure |
|---|---|
| Grey + white + black + pale green + magenta + other colours | White |
| Red + blue + other colours | Dark grey |
| Green + yellow + other colours | Pale grey |
| Unknown colours | Black |

```
* * * * * * * * * * *
*           *
*           *
*           *
*           *
*           *
*           *
*           *
*           *
*           *
* * * * * * * * * * *
```

```
* * * * * * * * * * *
*           *
*       1 1 *
*        1  *
*           *
*           *
*   2       *
*       2   *
*     2     *
* * * * * * * * * * *
```

```
* * * * * * * * * * *
*     1  1  *
*     111111*
*      1111 *
*        1  *
*           *
* 2         *
*222  2     *
*  2 2222   *
*    2222   *
* * * * * * * * * * *
```

```
* * * * * * * * * * *
*     111111*
*     1111111*
*      111111*
*       1111 *
* 2       1  *
*222   2    *
*2222222    *
*22222222   *
* 222222    *
* * * * * * * * * * *
```

```
* * * * * * * * * * *
*     1111111*
*    11111111*
*     1111111*
* 2    111111*
*222    111  *
*2222222    *
*22222222   *
*222222222  *
*22222222   *
* * * * * * * * * * *
```

```
* * * * * * * * * * *
*    11111111*
*    111111111*
*    211111111*
*2221111111*
*2222111111*
*22222222   *
*222222222  *
*2222222222*
*222222222  *
* * * * * * * * * * *
```

```
* * * * * * * * * * *
*   111111111*
* 1111111111*
*2211111111*
*2221111111*
*2222111111*
*222222221 *
*222222222*
*222222222*
*222222222*
* * * * * * * * * * *
```

```
* * * * * * * * * * *
*1111111111*
*1111111111*
*2211111111*
*2221111111*
*2222111111*
*2222222211*
*2222222222*
*2222222222*
*2222222222*
* * * * * * * * * * *
```

LEARNING METHOD FOR AN IMAGE ANALYSIS SYSTEM FOR USE IN THE ANALYSIS OF AN OBJECT AS WELL AS USES OF THE METHOD

The invention relates to a learning method for an image analysis system for use in the analysis of an object, wherein the object is compared with a reference object, and comprising the steps of:

a. capturing a video image of the reference object which is represented by a plurality of pixel positions, each pixel having its own identification.

b. dividing parts of the video image into a plurality of subareas which represent a plurality of classes.

The invention moreover relates to uses of the method.

Such a method is known e.g. from EP Patent Application No. 574 831. The method of this European publication comprises capturing a video image of an object and defining image areas of the video image on a video screen. Each of these areas is assigned to a specific class. Once the classes have been determined, an iterative process is initiated, comprising mapping the entire video image by means of the selected classes. In other words, the areas of the video image which have not been selected for a specific class, will be assigned to a class which depends on the colour value which the current pixel in the video image has. The method of this document forms histograms of colour occurrences for the classes and weighs the histograms with their probability of occurrence before assigning a pixel value to a cluster according to the intersection of the histograms.

Further, an image analysis system for classification of plants is known from U.S. Pat. No. 5,253,302. In this known system colour classes are formed, in which it is intended that each class contains representatives for variations within the same colour and as few representatives of other colours as possible. The document does not address the problem of overlapping between classes, as each colour class is formed in its own space. This implies eg that pixels to be classified, and which are located in a gap between two predefined classes and maybe are related to one or both classes, will not be assigned to any of these classes, but to the background class. Further, the principle from this US document can not easily be generalized to work simultaneously with more than two classes, because the thresholding only works between two classes ("class" and "not class"=background). Therefore, this prior art will not be very useful where more complicated colour combinations are to be analyzed.

An object of the invention is to provide a method of the type stated in the introductory portion of claim 1, in which complicated patterns can be analyzed and in which pixel identifications (such as colour) are assigned to previously defined classes for the entire image face.

The object of the invention is achieved by:

c. setting up a user-defined table of classes, where a plurality of identifications is assigned to each class in the table, each class in the able being formed by the user by his selection of a plurality of pixels in the reference image, d. setting up a special zero class in the table which contains pixel identifications which have not been assigned to any class by the user, and e. setting up a special conflict class which contains the pixel identifications which have been assigned to more than one class by the user.

f. assigning all pixels belonging to the zero class or the conflict class to the class having a pixel identification which is closest to the identification of the pixel concerned.

It is ensured in this manner that the teaching of the image analysis system can take place with a low process time, while currently monitoring whether the classes of the class table are selected expediently. Further, the entire image face will receive pixel values which belong to one of the selected classes, so that the entire image has now been converted into an image which is composed of the symbolic colour values occurring for the selected classes.

It is noted in this connection that the expression "which is closest to" should be interpreted in view of the selected pixel identification. If, e.g., this identification is expressed as a set of parameters in the form of a vector, the expression "which is closest to" may be interpreted as the nearest vector distance.

When, as stated in claim 2, the assignment takes place in several stages, each stage comprising processing pixel identifications which adjoin pixel identifications which have already been assigned to a class, it is ensured that the colour composition of the "taught" system has colour change areas which correspond to the original image, but now with more distinct details. Thus, the teaching of the system takes place by adding a growth to the original image, an identification being allocated to all pixels in the image.

For the purpose of using the system for analysis proper, i.e. use of the system after learning, it is an advantage if several reference images are used in the learning, since this allows provision of an image which is representative of an average of objects to be analyzed.

Owing to the flexibility of the image analysis system in the learning it is an advantage, as stated in claim 5, that a user-selected class may be suppressed, which may be desirable if too many items of colour information have been allocated to the selected class.

Other expedient embodiments of the invention are defined in the remaining dependent claims.

As mentioned, the invention also relates to uses of the method. These uses are defined in claims 9–14.

Several of these uses contain very complicated image compositions, but thanks to the very flexible class table structure according to the invention it is possible to provide extremely useful analyses which have been impossible to perform till now without using much more complicated analysis systems.

BRIEF DESCRIPTION OF THE DRAWINGS

The invention will now be explained more fully below with reference to an example which is shown in the drawings and illustrates the principles of the invention. In the drawings:

FIG. 2 generally shows a display which may e.g. be a screen for a PC adapted to receive instructions from the user for use when performing the principles of the invention. The numeral 9 designates an image, shown here as a test pattern for DR-TV which is to be used as a reference image in the teaching of the image analysis system. The numeral 8 designates a first class 1 whose identification at 10 is shown as a background. A further position, for which the colour green has been chosen, may be selected below the position 8. Each of these colours corresponds to a class which may be selected arbitrarily by the user, who has the option of changing colour in the class concerned. As additionally shown by the display of FIG. 2, a symbol field "show error" is shown at 12, said "show error" field being adapted to show how the selected classes will transform the image 9. The numeral 13 designates a functional field that may be activated by means of a mouse, which initiates the next stage of the learning, as will be explained in connection with FIG. 6. Further, the numeral 14 designates a functional field in which all classes may be reset at once, if the classification made by the user is not expedient. Finally, the numeral 15 designates a functional field which is adapted to remove one or more of the classes selected previously.

Figure 1:
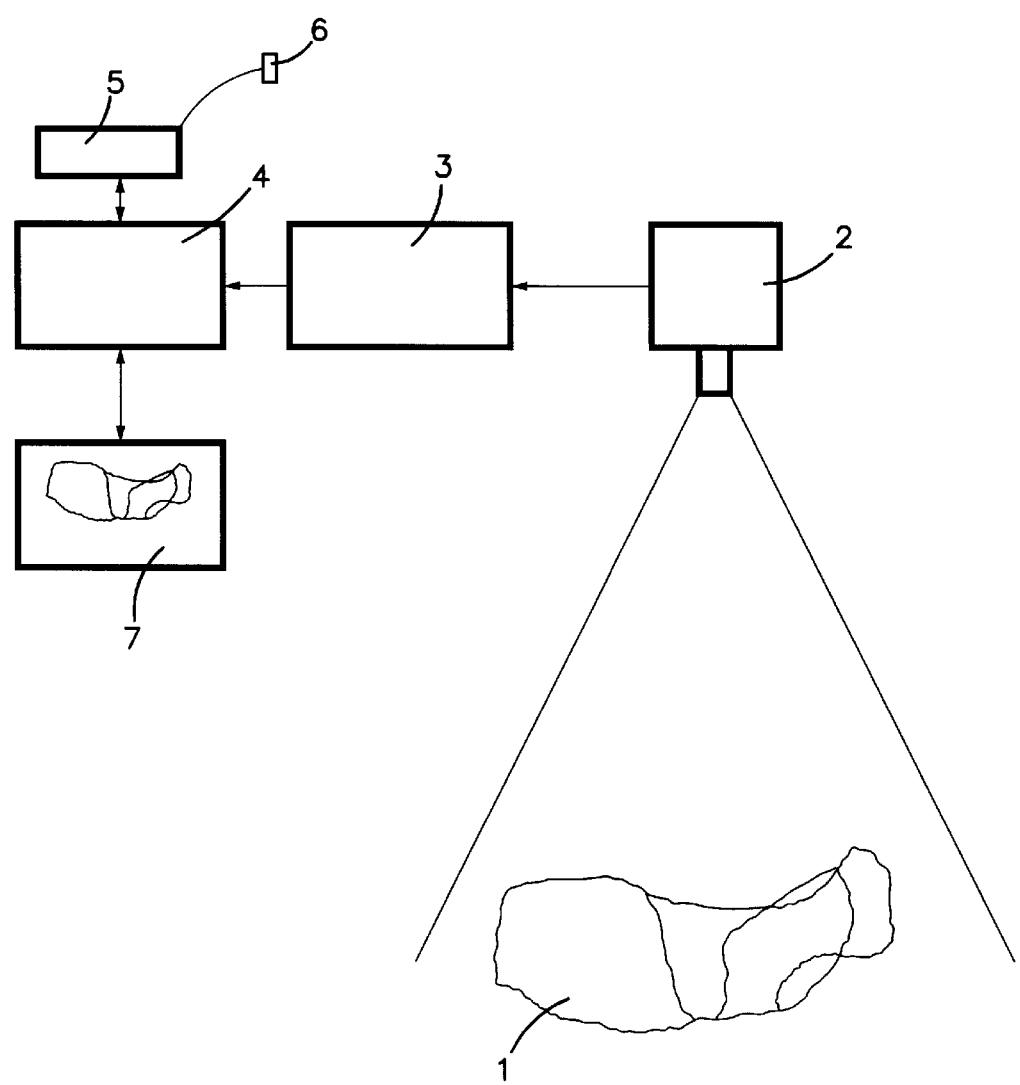
FIG. 1 shows an analysis set-up for use in the method according to the invention.
Figure 2:
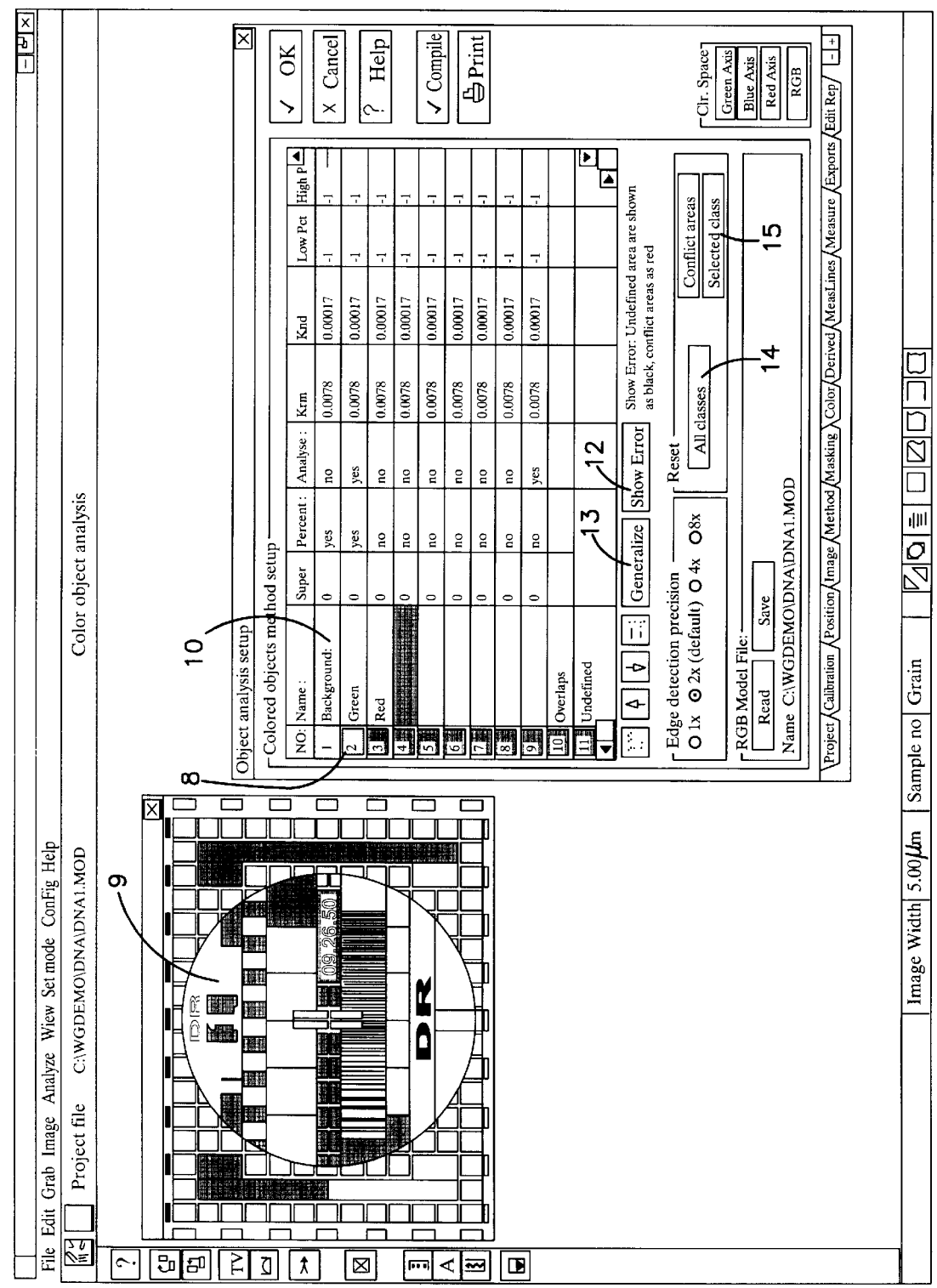
FIG. 2 shows a user display for use in the teaching of the system according to the invention.
Figure 3:
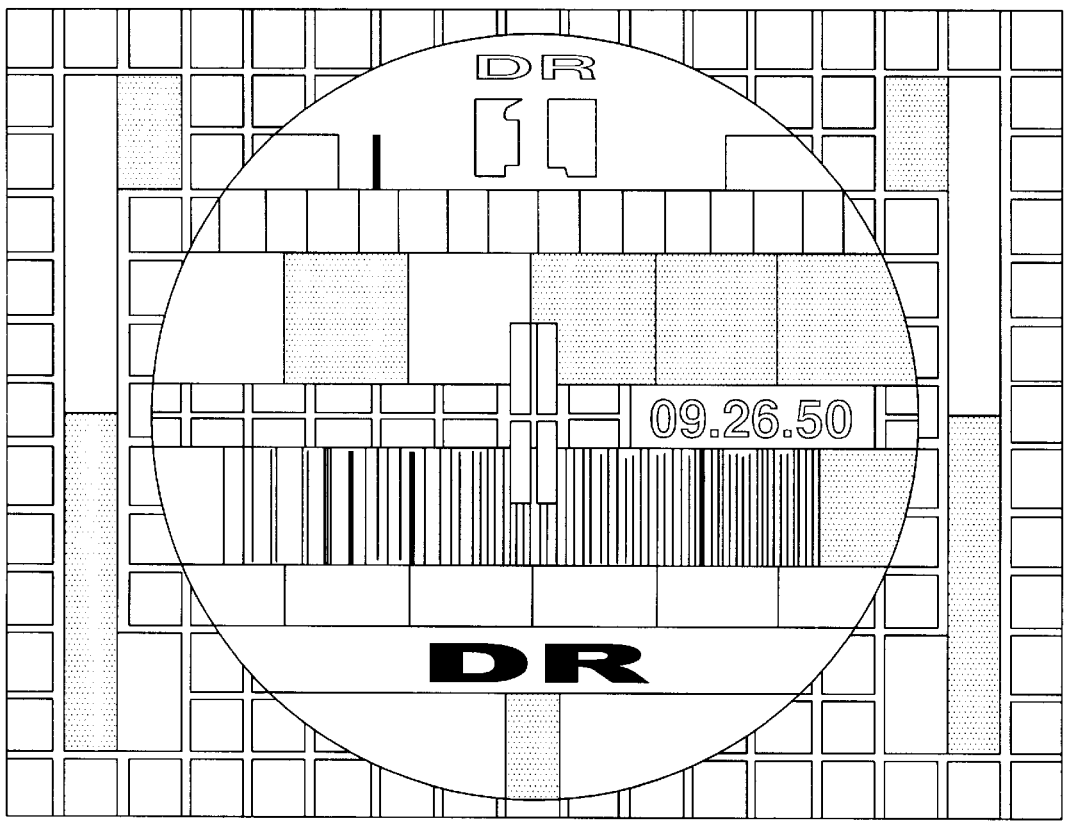
FIG. 3 shows the use display after an image has been classified.

The system of FIG. 2 operates in the following manner:

The user selects areas on the image 9 which are defined by means of a line or a polygon. All the pixels encircled by the line or the polygon are then assigned to a class, e.g. No. 1, and a colour, which may e.g. be the background 10, is then selected for the associated class. What now happens is that all pixel identifications comprised by the line or the polygon will be assigned to the class 1. It is noted in this connection that identifications are taken to mean a set of one or more numerical values which describe properties of the pixel concerned. Then a new class is set up by drawing another line or polygon. In this case a class with a number of pixels will likewise be set up, but pixels previously assigned to class 1, will now be removed from the new class as well as from the old class and be transferred to a so-called conflict class. The procedure is repeated with a suitable number of classes, which may be up to 8 in the shown display of FIG. 2, which, however, is not to be regarded as a restriction. Once all the classes have been selected, the functional key 12 is activated, and an image like the one shown in FIG. 3 will appear. A selection of four classes is shown in FIG. 3, viz. a first class, where grey, white, black, pale green, magenta and other colours have been assigned to the first class, which is called white, while the next class has been given the colour grey, formed by the shades red, blue plus some other colours. Finally, the colours green, yellow plus some other colours have been assigned to the class pale grey, while unknown colours, i.e. colours not found in any other class, have been given the shade black. Activation of the key 12 in FIG. 2 provides an image which has the appearance shown in FIG. 3. It will now be seen that the image has been distorted somewhat, as only pixels contained in the classes indicated in FIG. 3 are included in the image.

Figure 4:
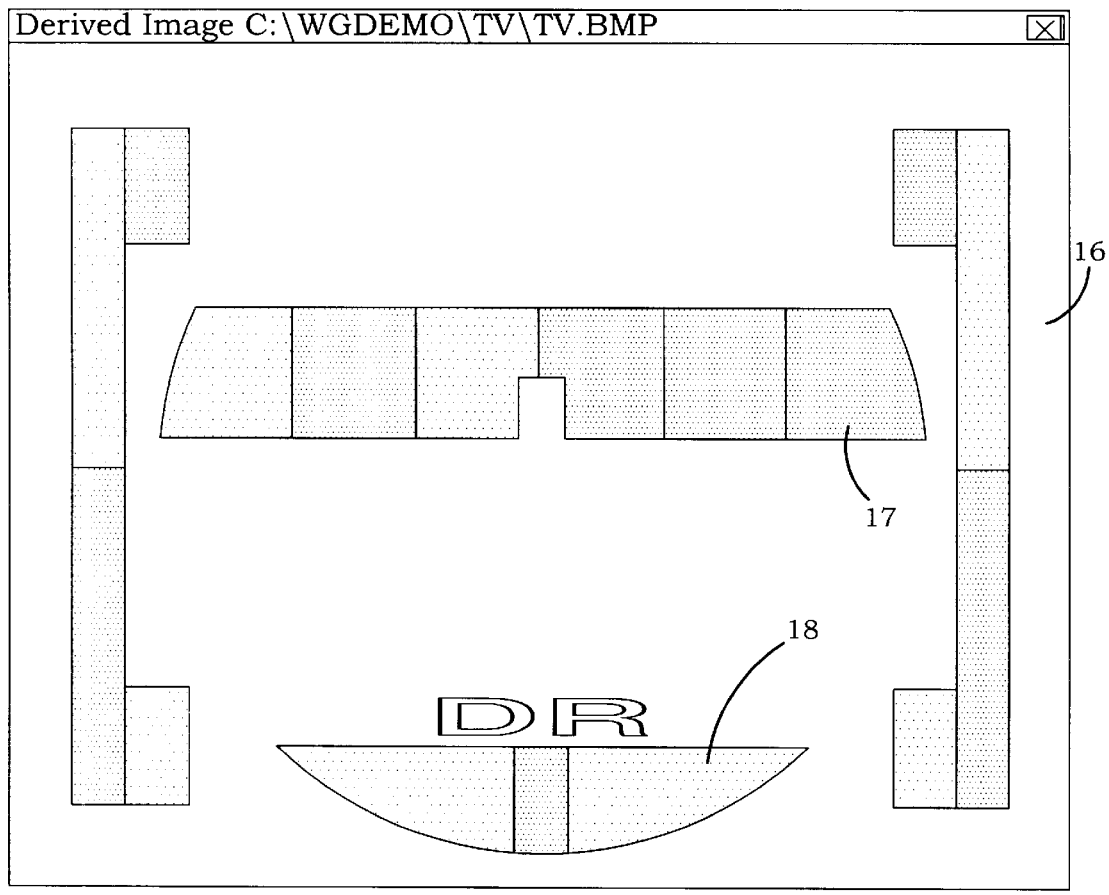
FIG. 4 shows the user display of FIG. 3 after a further teaching stage of the image analysis system.
Figures 6A, 6B, 6C, 6D, 6E, 6F, 6G, 6H, 6I:
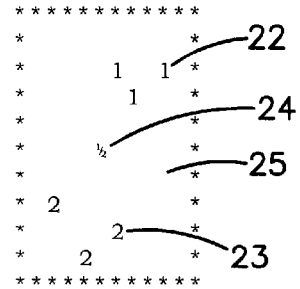

FIG. 4 shows a next stage in the teaching process of the image analysis system according to the invention. For the understanding of FIG. 4 it is expedient to have a look at FIGS. 6A–6I. FIGS. 6A–6B thus show a first stage in the teaching of the image system according to the invention, more particularly the process stages occurring in connection with the matter shown in FIGS. 2 and 3. In FIG. 6A the starting point is a blank screen, and FIG. 6B shows the selection of two classes, where class 1 has been given the designation 22, while class 2 has been given the designation 23. These classes have been produced e.g. by drawing a line or a polygon on the screen. As will additionally be seen from FIG. 6B, the numeral 24 designates ½, the reason being that the polygon or line selected has hit a pixel value which belongs to both classes. This is removed in FIG. 6C so that both classes are unambiguously defined on the screen image.

It should be noted that there are some areas which it has not been possible to assign to any class, the reason being that they contain pixel identifications which are not contained in any of the two classes.

To arrive at the result in FIG. 4, the following stages shown in FIGS. 6D–6E take place. In FIG. 6D, positions of pixels disposed in the vicinity of class 2 are filled by pixel identifications which correspond precisely to class 2. Correspondingly, pixel identifications encircled by pixel identifications in FIG. 6C, which have the class 1, have been assigned to the class 1. The process continues in FIG. 6E, and, as will be seen from the subsequent figures, the entire image field is filled with pixel values which may be allocated either to class 1 or to class 2. This may be expressed in the manner that once the classes have been selected, it is decided to allow the image to "grow" in stages, following which all pixels in the entire image are given a pixel identification. It should be noted that time-consuming calculations may be avoided by dividing the image in this manner.

It is noted that the teaching of the image analysis system according to the invention, as shown in FIGS. 6A–6I, is highly simplified. Thus, of course, nothing prevents the use of several classes, and the stages shown in FIGS. 6D–6I from taking place in several dimensions.

Figure 5:
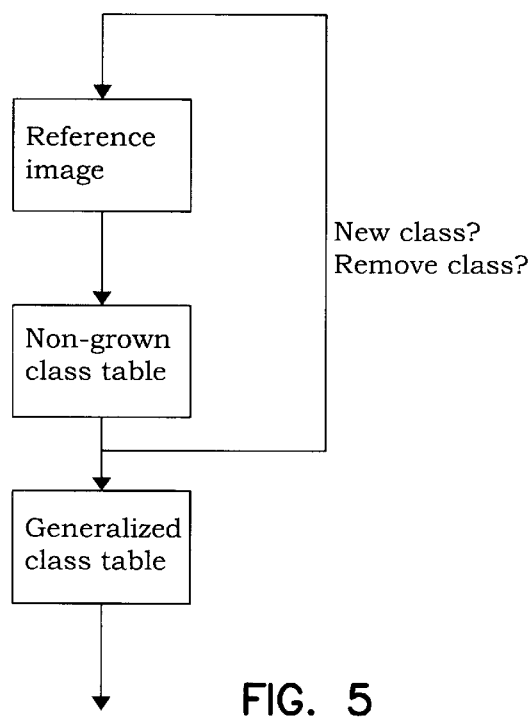
FIG. 5 is a block diagram of a process stage in the teaching of the image analysis system of FIG. 3, and FIGS. 6A–6I schematically show several stages in the teaching of the image analysis system of FIG. 4.

FIG. 5 shows a block diagram of a routine in the division of a reference image for use in the teaching of the image analysis system according to the invention, in the first stage. As will be seen, a first reference image is shown initially and is processed by means of the marking field 12 in FIG. 2, which results in the display of a non-grown image. If it now turns out that the image is much too uniform or does not contain the desired information, a new class may be set up, which is shown by the feedback loop. Alternatively, a class may be removed, which may perhaps be necessary if the selected class contains too many pixel identifications. Classes may be set up and be removed in this manner until the resolution required for the purpose of analysis is achieved.

A system as described above offers an incredible number of applications because it is flexible, both as regards analysis of very complicated patterns and as regards analysis of very simple patterns.

Examples of possible applications include:

Exposure (image processing like e.g. in a photo shop)

Analysis of bacteria

Analysis of cells/tissue

Evaluation of wood

Quality control in the textile industries

Quality control in industrial laundries (stains, holes and discoloration)

Analysis of cement

Geological analysis

Metallurgy

Analytical chemistry

Grading of fruit, vegetables, berries or the like

Analysis of plastics

Quality control in the food industries, e.g. of cuts of meat.

Although the invention has been described in connection with very flexible teaching of an image analysis system, nothing prevents the principles of the invention from being used in other connections.

The principles may e.g. be generalized as follows:

Each of a plurality of objects N has properties characterized by an identification in the form of sets of parameters $X_1$, $X_2 \ldots X_n = X_n \ldots$ A plurality of objects y, where y<N, each object y having the identification $X_n$, is now given the same identification $X_{n,i}$, which is called class 1. Similarly, another plurality of objects Z is picked out, where 2<N, and these objects are given the identification $X_{n,2}$, which is called class 2. The process continues until a suitable number of classes has been created. Then, all objects are localized in N which have not been assigned to a class, or which have been assigned to more than one class. These objects are assigned to a class whose identification is closest to the current identification of the object concerned, which may be done e.g. by using the vector distance between the parameter sets of the individual objects and the identification of the classes. This provides a system which is generally useful in connection with automatic classification of objects.

What is claimed is:

1. A learning method for an image analysis system for use in analyzing an object, wherein a representation of the object is compared with a representation of a reference object, and comprising the steps of:
   a. capturing a reference image of the reference object which is represented by a plurality of pixel positions, each pixel having its own pixel identification,
   b. dividing parts of the reference image into a plurality of subareas which represent a plurality of classes,
   c. setting up a user-defined table of classes where a plurality of pixel identifications are assigned to each class in the table, each class in the table being formed by the user by his selection of a plurality of pixels in the reference image,
   d. setting up a zero class in the table which contains pixel identifications which have not been assigned to any class by the user,
   e. setting up a conflict class which contains the pixel identifications which have been assigned to more than one class by the user, and
   f. assigning all pixels belonging to the zero class or the conflict class to a class having a pixel identification which is closest to the identification of the pixel concerned.

2. A method according to claim 1, characterized in that the assignment takes place in several stages, each stage comprising processing pixel identifications which adjoin pixel identifications which have already been assigned to a class.

3. A method according to claim 1, characterized in that the user-operated table of classes is formed by drawing a line, a polygon or the like on the video image.

4. A method according to claim 1, characterized in that several reference images are used in the learning.

5. A method according to claim 1, characterized in that a user-selected class may be suppressed.

6. A method according to claim 1, characterized in that the identifications of the individual pixels may be expressed in an N-dimensional space.

7. A method according to claim 1, characterized in that the identifications of the individual pixels are expressed in RGB coordinates or in HSI coordinates.

8. A method according to claim 1, characterized in that an object is analyzed by assigning to each pixel position in the image which represents the object with a given identification, the class symbol which contains precisely the identification valid after learning.

9. A method according to claim 1, wherein the method for use in analyzing the object includes the analysis of cells/tissue.

10. A method according to claim 1 wherein the method for use in analyzing the object includes the analysis of cuts of meat.

11. A method according to claim 1, wherein the method for use in analyzing the object includes metallurgical analyses.

12. A method according to claim 1, wherein the method for use in analyzing the object includes the grading of fruit, vegetables, and berries.

13. A method according to claim 1, wherein the method for use in analyzing the object includes the analysis of cement.

14. A method according to claim 1, wherein the method for use in analyzing the object includes the analysis of fabrics.

* * * * *